United States Patent 
Wellen et al.

(10) Patent No.: US 12,484,668 B2
(45) Date of Patent: Dec. 2, 2025

(54) EXTENDABLE DUAL HANDLE SHAFT

(71) Applicant: TWO SEVENTY SIX LLC, Redondo Beach, CA (US)

(72) Inventors: Nathaniel Wellen, Redondo Beach, CA (US); Alexander Wellen, Redondo Beach, CA (US)

(73) Assignee: TWO SEVENTY SIX LLC, Redondo Beach, CA (US)

( * ) Notice: Subject to any disclaimer, the term of this patent is extended or adjusted under 35 U.S.C. 154(b) by 0 days.

(21) Appl. No.: 19/018,985

(22) Filed: Jan. 13, 2025

(65) Prior Publication Data

US 2025/0143425 A1    May 8, 2025

Related U.S. Application Data

(63) Continuation of application No. PCT/US2024/037361, filed on Jul. 10, 2024.

(60) Provisional application No. 63/580,421, filed on Sep. 4, 2023, provisional application No. 63/513,854, filed on Jul. 14, 2023.

(51) Int. Cl.
*A45B 9/02* (2006.01)
*A45B 9/00* (2006.01)

(52) U.S. Cl.
CPC .......... *A45B 9/02* (2013.01); *A45B 2009/007* (2013.01); *A45B 2200/1081* (2013.01)

(58) Field of Classification Search
CPC ................ A45B 9/02; A45B 2009/007; A45B 2200/1081
USPC ......................................................... 16/429
See application file for complete search history.

(56) References Cited

U.S. PATENT DOCUMENTS

| 4,733,681 A | 3/1988 | Lee |
| 4,790,338 A | 12/1988 | Strobl |
| 5,186,197 A | 2/1993 | Lavine |

(Continued)

FOREIGN PATENT DOCUMENTS

| CN | 110226821 B | 4/2023 | |
| FR | 3017517 A1 | 8/2015 | |
| WO | WO2016050999 A1 * | 7/2016 | ............. A45B 19/04 |

OTHER PUBLICATIONS

International Search Report, Application No. PCT/US2024/037361, dated Nov. 19, 2024.

(Continued)

*Primary Examiner* — Noah Chandler Hawk
(74) *Attorney, Agent, or Firm* — Allan A. Fanucci

(57) ABSTRACT

In a device that includes an elongated member and a first grasping handle associated therewith for holding or manipulation of the device, the present invention provides an improvement in the form of a second grasping handle and extension member that is operatively associated with the elongated member. The extension member is capable of adjustably and fixedly positioning the second grasping handle in any one of a number of fixed positions spaced a distance away from the first grasping handle, including an inoperative position and a number of operative positions. When the second grasping handle is in an operative position, a first user can grasp the first grasping handle and a second user can grasp the second grasping handle. The second grasping handle when in the inoperative position is attached to or located at least partially or fully within the first grasping handle.

22 Claims, 12 Drawing Sheets

(56) References Cited

U.S. PATENT DOCUMENTS

| | | | |
|---|---|---|---|
| 5,433,551 A * | 7/1995 | Gordon | F16B 7/149 |
| | | | 403/368 |
| 5,598,598 A * | 2/1997 | Sorenson | B25G 1/04 |
| | | | 15/230.11 |
| 5,743,577 A * | 4/1998 | Newman, Jr. | B25J 1/04 |
| | | | 403/109.1 |
| 7,261,112 B2 | 8/2007 | Liu | |
| 7,726,326 B2 | 6/2010 | O'Donnell et al. | |
| 9,609,926 B2 | 4/2017 | Haythornthwaite et al. | |
| 10,143,276 B1 | 12/2018 | Wellen et al. | |
| 11,628,554 B2 * | 4/2023 | Resh | B25G 3/18 |
| | | | 81/489 |
| 11,926,032 B2 * | 3/2024 | Harrington | B25G 1/102 |
| 2003/0131875 A1 * | 7/2003 | Wu | A45B 25/006 |
| | | | 135/25.4 |
| 2008/0193196 A1 * | 8/2008 | Sandahl | B05C 17/0325 |
| | | | 401/170 |
| 2019/0274401 A1 | 9/2019 | Humphrey et al. | |

OTHER PUBLICATIONS

Written Opinion of the International Searching Authority, Application No. PCT/US2024/037361, dated Nov. 19, 2024.
International Preliminary Report on Patentability (Chapter II), Application No. PCT/US2024/037361, dated Jan. 9, 2025.
Response to International Preliminary Report on Patentability (Chapter II), Application No. PCT/US2024,037361, dated Jan. 10, 2025.

\* cited by examiner

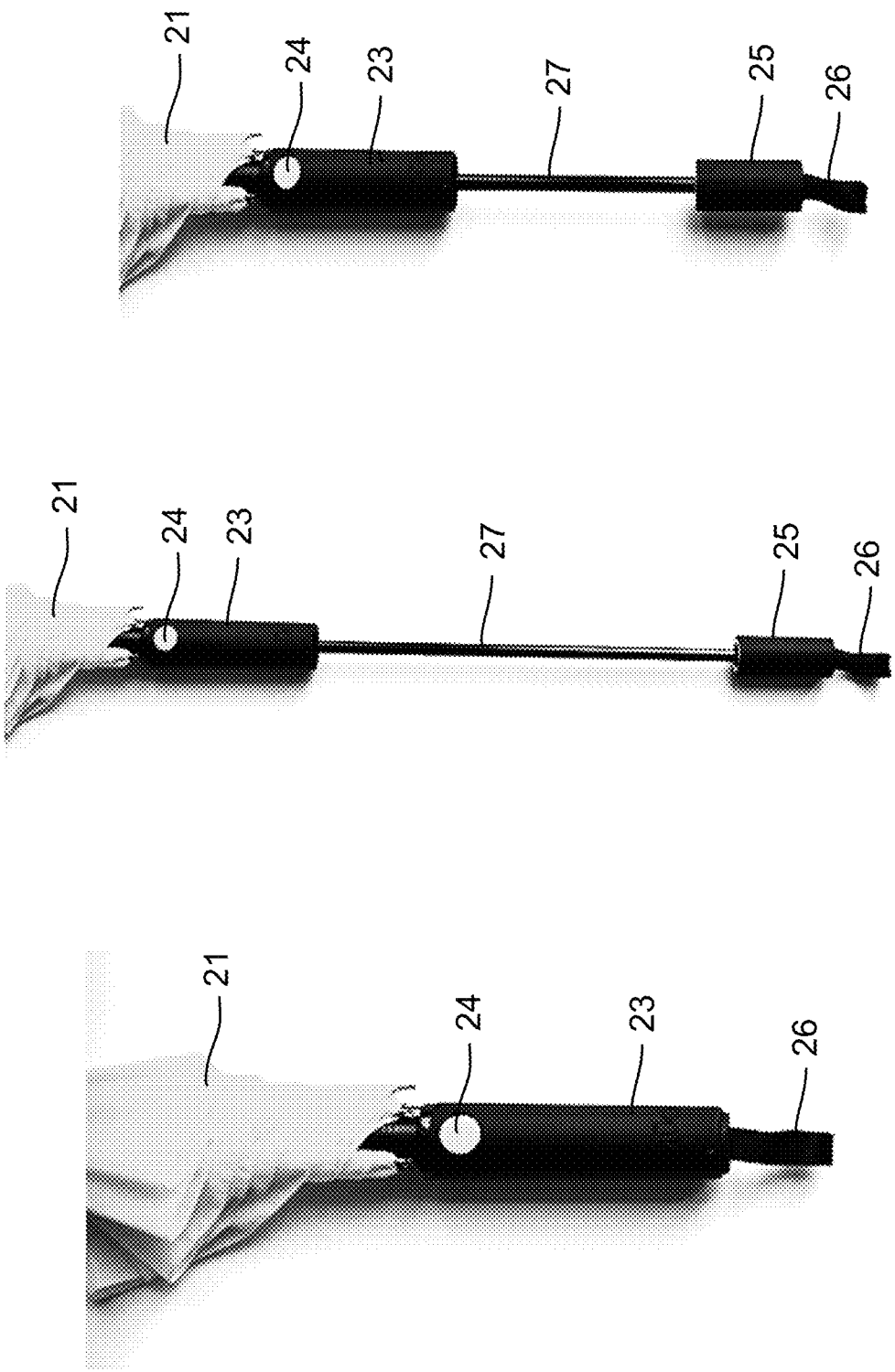

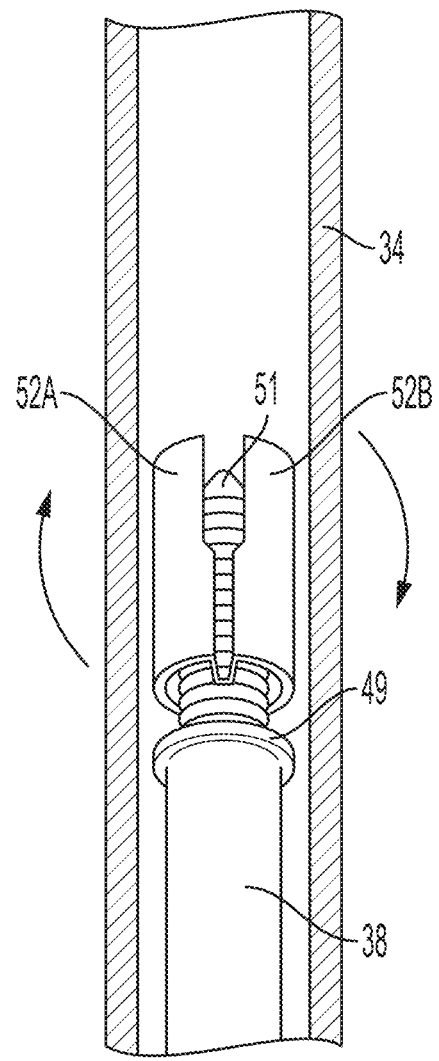
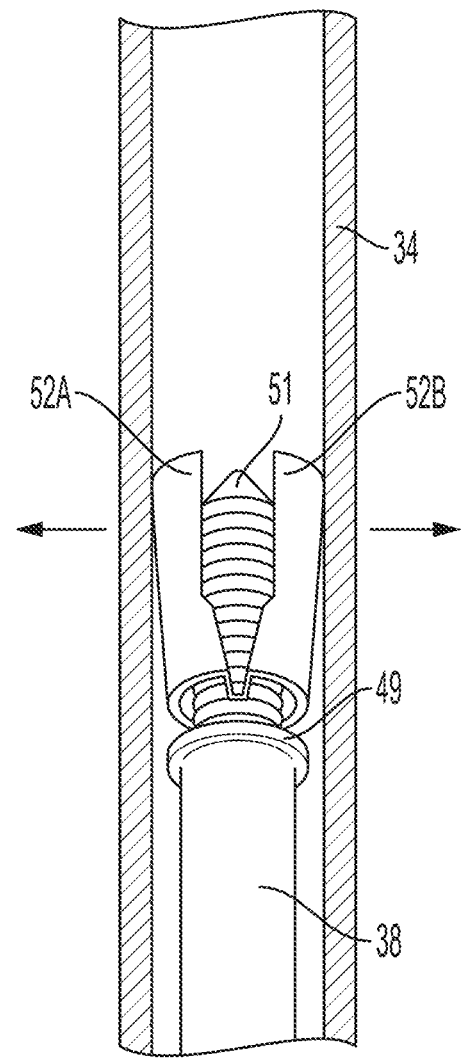
FIG. 20A  FIG. 20B

EXTENDABLE DUAL HANDLE SHAFT

CROSS-REFERENCE TO RELATED APPLICATIONS

This application is a continuation of International Application no. PCT/US2024/037361 filed Jul. 10, 2024, which claims the benefit of U.S. provisional applications Nos. 63/513,854 filed Jul. 14, 2023 and 63/580,421 filed Sep. 4, 2023. The entire content of each application mentioned above is expressly incorporated herein by reference thereto.

TECHNICAL FIELD

The present invention relates to a dual handle extendable shaft construction for use in various devices. In a particularly preferred embodiment, the device is an umbrella in which each grasping handle can be held or grasped by a different user, such as two people of different heights like a couple or parent and child. Other embodiments are directed to other devices where the two handles are provided for improved operation of the device in that each handle can be grasped by the same or different users.

BACKGROUND ART

There are various devices in the art that are operated by a handle attached to a shaft. One example is an umbrella, which is a folding canopy typically supported by metal ribs and usually mounted on a metal or plastic pole or shaft. Umbrellas are primarily hand-held portable devices sized for personal use and generally can be divided into two categories: fully collapsible umbrellas, in which the metal pole supporting the canopy retracts, making the umbrella small enough to fit in a handbag; and non-collapsible umbrellas, in which the support pole cannot retract and only the canopy can be collapsed. Another distinction can be made between manually operated umbrellas and spring-loaded automatic umbrellas which spring open at the press of a button. Commercial umbrellas utilize a single handle for gripping by the user.

Certain prior references disclose the provision of multiple grips on the shaft. For example, U.S. Pat. No. 10,143,276 discloses a dual handle umbrella is disclosed, wherein the umbrella comprises a pole that is operatively associated with a first upper user grasping handle for holding the umbrella upright, and wherein the umbrella further comprises a second lower handle spaced by a distance away from and below the first upper user grasping handle provided by an extension member. The extension member is adjustable to place the second lower handle at different distances away from the first upper user grasping handle, such that a person, who is shorter than the user can hold onto the umbrella by grasping the second lower handle. Other references disclosing multiple grips include U.S. Pat. No. 7,726,326, French application FR 3017517 and PCT application WO 2016/050999. The two grips disclosed in these documents are always spaced from each other.

It has now been found that there is a need for improvements on such multiple grip devices, in particular for umbrellas, and various necessary improvements are now provided by the present invention.

SUMMARY OF THE INVENTION

The invention now provides an improved device comprising an elongated member and a first grasping handle associated therewith for holding or manipulation of the device, with the improvement comprising a second grasping handle and extension member that is operatively associated with the elongated member, with the extension member capable of adjustably and fixedly positioning the second grasping handle in any one of a number of positions spaced a distance away from the first grasping handle, including an inoperative position and a number of operative positions, wherein the second grasping handle is in an operative position, a first user can grasp the first grasping handle and a second user can grasp the second grasping handle, and wherein the second grasping handle when in the inoperative position is attached to or located at least partially or fully within the first grasping handle.

Typically, the first grasping handle is affixed to the elongated member and the second grasping handle is affixed to the extension member. Preferably, the second grasping handle in the inoperative position is attached to the first grasping handle. In one embodiment, one of the first or second grasping handles includes a snap locking recess and the other of the first or second grasping handles includes a protrusion that is received in the snap locking recess to attach the first or second grasping handles together in the inoperative position. The device may also include a releasing member to release the second handle for deployment when the second grasping handle is to be moved to an operative position. This releasing member is operatively associated with a spring and provides sufficient force to also disengage the protrusion from the snap locking recess.

In one embodiment, the second grasping handle in the inoperative position may be located at least partially or fully within the first grasping handle. Alternatively, the first grasping handle in the inoperative position may be located at least partially or fully within the second grasping handle.

The device typically includes an elongated member of a pole, pipe, tube, conduit or hollow rod member, and the extension member is a pole, pipe, tube, conduit, bar or solid rod member that is configured to move with respect to the elongated member. The elongated member, the extension member, or each may have a telescopic construction wherein one member is received within the other to facilitate movement between them. If desired, the device may include a conventional distance limiting member operatively associated with the elongated member or the extension member or both to prevent the extension member from disassociating from the elongated member.

The device preferably includes a biasing member which provides a force to urge the extension member towards an operative position, a locking member that locks the biasing member in an inoperative position, and an engagement member that releases the locking member when the second grasping handle is to be moved to an operative position.

The device may also include a locking mechanism for retaining the extension member in an operative position, wherein the locking mechanism for retaining the extension member in an operative position comprises a twist locking mechanism which is engaged by twisting the extension member with respect to the elongated member. This locking mechanism preferably comprises a cam-lock interlocking device that provides lockable positions along the shaft of the elongated member, the cam locking device comprising a cam or protuberance constructed in the inner surface of the interlocking device which is arranged to press against the extension member when the interlocking device is in a locked condition and not press against the extension member when the interlocking device is in an unlocked condition.

In one arrangement, the first grasping handle includes a generally cylindrical portion for grasping by the first user's hand and the second grasping handle includes a generally cylindrical portion for grasping by the second user's hand. Also, the elongated member may include a telescopic reach extender.

Suitable devices for use in this invention include but are not limited to an umbrella, a ceiling light bulb changing device, a squeegee, a painting tool, a cleaning implement, a wrench, or a surgical tool.

In a most preferred embodiment, the invention relates to an umbrella having a canopy along with the extendable dual handle shaft structure described herein. In this umbrella, the first and second grasping handles in the inoperative position may be attached to each other and in some arrangements one of the first and second grasping handles are partially or fully retracted in the other handle. The elongated member may include a telescopic reach extender, and a twist locking mechanism for positioning of at least one of the handles.

The umbrella canopy is deployable from an end of the elongated member opposite the first grasping handle. Generally, the canopy and second handle are deployable upon engagement of a deployment member associated with one of the first or second handles, wherein the deployment member is a button or dial located on a side or bottom surface of the second handle. Also, the canopy is constructed to be sufficiently large to accommodate two users thereunder.

BRIEF DESCRIPTION OF THE DRAWINGS

A more complete understanding of the invention may be obtained from a review of the appended drawing figures which provide details of the preferred embodiments, wherein:

FIG. 14 is a side view of the dual handle umbrella of FIG. 11 to illustrate the second handle in an inoperative position;

FIG. 15 is a view of the unitary dual handle umbrella of FIG. 11 in an extended conformation, with the second handle spaced as far as possible from the first handle;

FIG. 16 is a side view of the unitary dual handle umbrella of FIG. 11 in a partially extended conformation, with the second handle spaced approximately midway between the compact and extended conformations of FIGS. 14 and 15;

FIGS. 20A and 20B are cross-sectional detailed views of a preferred twist locking mechanism for the umbrella of FIG. 17.

DETAILED DESCRIPTION OF THE PREFERRED EMBODIMENTS

Figure 1:
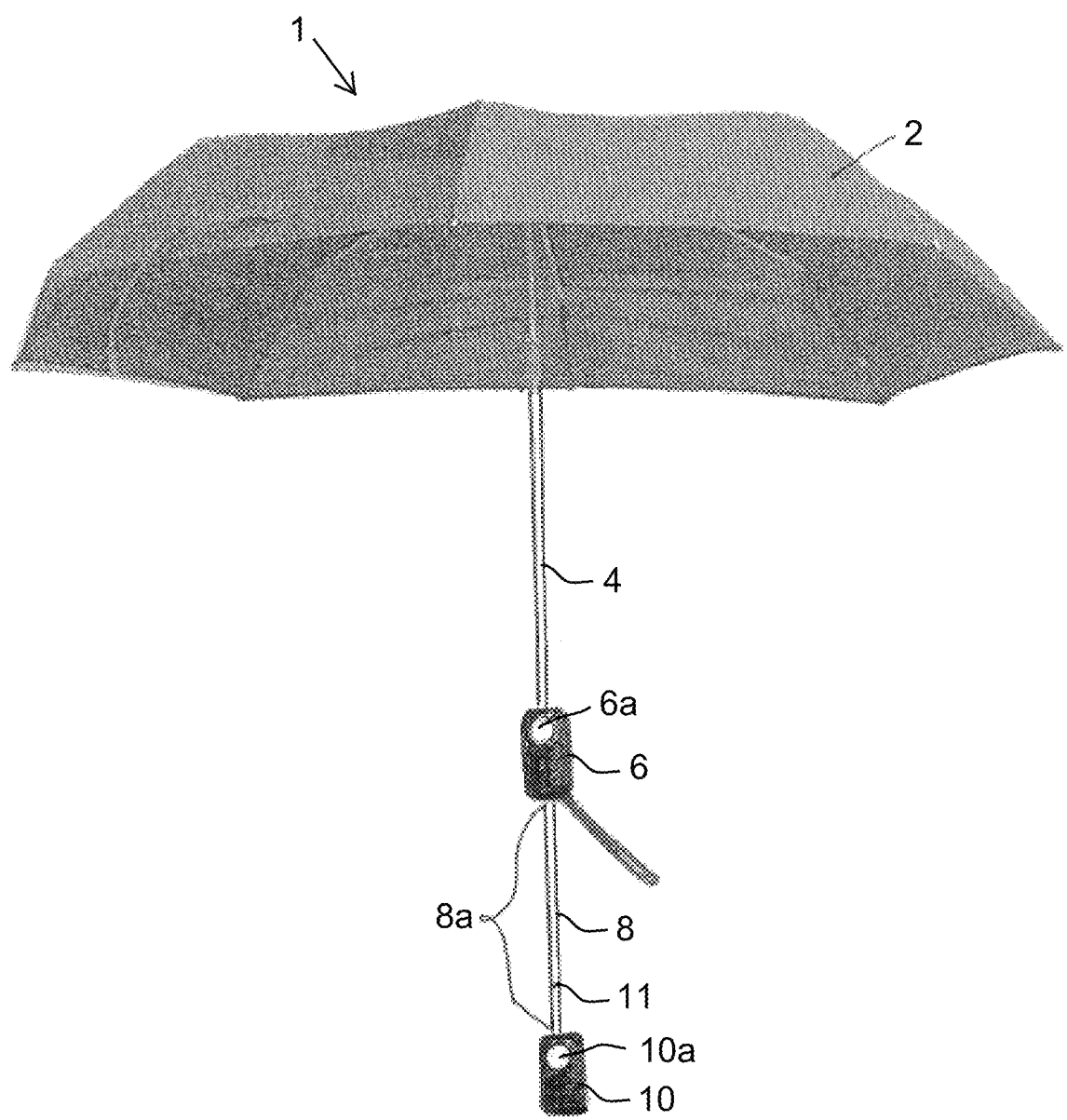
FIG. 1 depicts a side view of an extended conformation of the unitary dual handle umbrella in accordance with one embodiment of the invention.

The following definitions generally set forth the parameters of the most preferred embodiments of the present invention, which is exemplified by an umbrella having an extendable dual handle as described herein. As is well known, an umbrella is a device that protects the user from the elements and in particular from liquid and frozen precipitation or even the sun, etc. A traditional umbrella has the following parts: a pole, a canopy, ribs, a runner, springs and a ferrule. A pole is the metal or wooden shaft that runs between the umbrella's handle at the bottom and the canopy at the top. The canopy is the fabric part of the umbrella that catches the rain, the wind and the sun. The ribs are what give an umbrella its structure and shape. Outer ribs hold up the canopy and inner ribs (sometimes called stretchers) act as supports and connect the outer ribs to the umbrella pole. A runner slides up and down the pole while connected to the ribs/stretchers, and is responsible for the opening and closing of the canopy. Many umbrella designs include a top spring to hold the runner up when the canopy is open, a bottom spring to hold the runner down when the canopy is closed, and sometimes a center ball spring to extend the pole length in telescopic models. Umbrellas typically are in the form of a fixed shaft model which is relatively sturdy, or in a compact telescopic model that is lightweight and relatively smaller in size than the fixed shaft model when the compact telescopic model is fully compressed.

As used herein this disclosure, the term "pole" is the shaft that runs between the umbrella's handle at the bottom and the canopy at the top.

As used herein this disclosure, the term "canopy" refers to the fabric part of the umbrella that is functioned to catch rain, wind, sun, hail, snow and the like.

As used herein this disclosure, the term "telescopic extension member" refers to concentric tubular sections which are designed so as to slide easily into one another.

As used herein this disclosure, the term "opposite" refers to something having a position on the other or further side of something else, thus facing something, especially something of the same type.

As used herein this disclosure, the term "substantially" is meant to have the equivalent meaning of essentially, largely, considerably or the like.

As used herein this disclosure, the term "maximum" refers to the greatest quantity or value attainable or attained.

As used herein this disclosure, the term "minimum" refers to the least quantity assignable, admissible, attainable or possible.

As used herein this disclosure, the term "height" is the measurement of a vertical distance, whereas the term "length" is the measurement of a horizontal distance.

As used herein this disclosure, the term "collapsible" refers to the vertical adjustment of the height of the telescopic extension member.

As used herein this disclosure, the term "arcuate" refers to a structure that is substantially curvilinear.

Additionally, all dimensions recited herein are approximate and can vary by as much as ±10% to in some case ±25%. In some situations, the term "about" is used to indicate this tolerance. And when the term "about" is used before reciting a range, it is understood that the term is applicable to each recited value in the range. Often, the craftsmanship and engineering procedures that are followed in construction of these umbrellas minimize these tolerances as much as possible or industrially practical from the specifically recited values.

Now, generally referring to the drawings in which like numerals represent like components throughout the several views, the preferred embodiments of the present invention are next described. These figures depict various preferred embodiments of the present invention. Having said that, however, it should be clearly understood that these figures are merely provided as exemplary in nature, and they should in no way serve to limit the scope of the invention.

Figure 2:
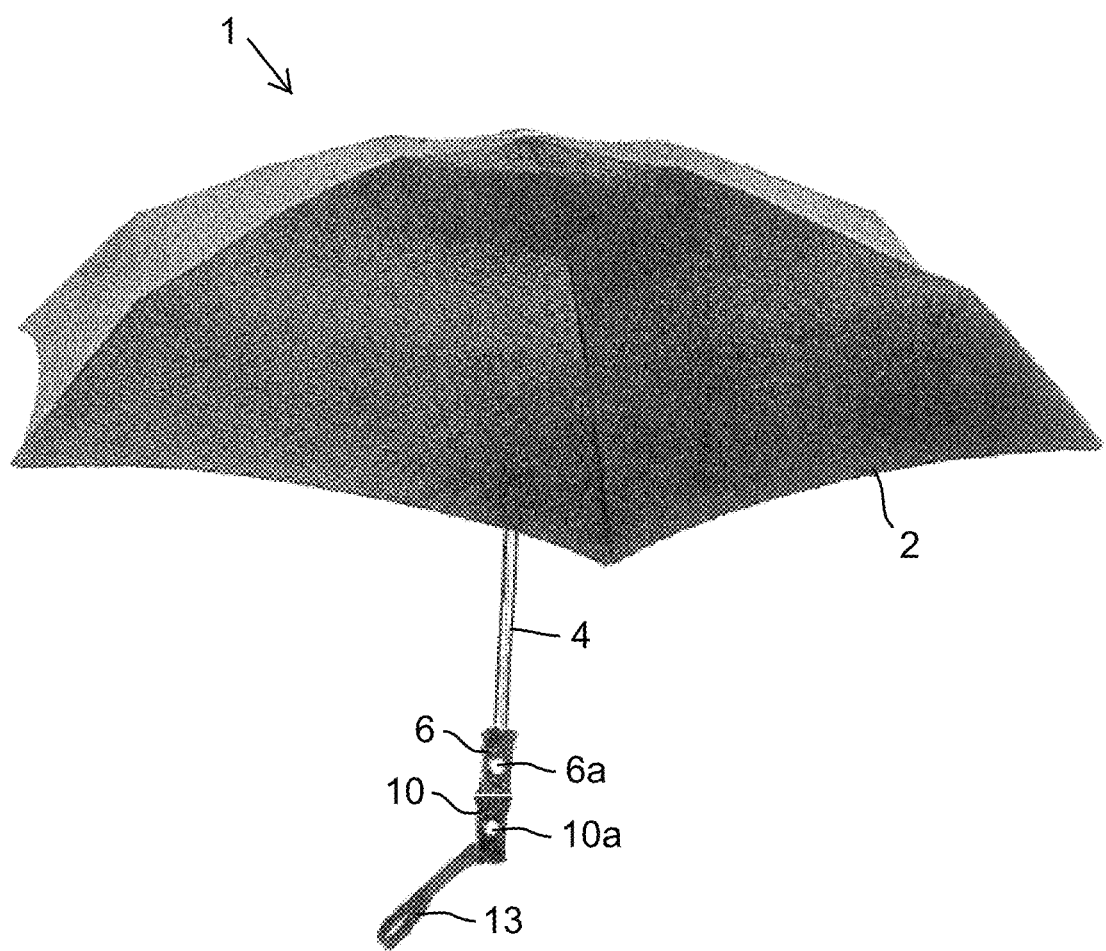
FIG. 2 shows a side view of a shortened conformation of the dual handle umbrella in accordance with another embodiment of the invention.

In an embodiment, the dual handle umbrella can take the form of a unitary design as depicted in FIGS. 1 and 2. This unitary dual handle umbrella (1), is composed of a canopy (2) attached to the upper part of an umbrella pole (4). Ideally, the canopy (2) is preferably made of a water-resistant fabric in order to protect the user against the harmful elements directly caused by the weather. This may advantageously be microfiber fabrics like nylon that are then coated with special water repellant finishes. In any event, a skilled artisan would know that any material may be used to make the canopy (2), which does not subsequently compromise its ability to repel water.

The pole (4) is preferably made of a metallic material such as but not limited to e.g., steel or aluminum. However, one of ordinary skill in the art will appreciate that any such material that will not compromise the basic function of the umbrella (1) can be utilized in this regard like e.g., wood, fiberglass or other plastic types. The pole (4) is typically a hollow tube and is operatively associated and is connected directly with a first grasping handle (6) for holding the umbrella (1) upright when the umbrella (1) is open for use. The first grasping handle (6) further has built therein a button (6 *a*) to operate the umbrella (1). When button (6 *a*) is engaged, the canopy (2) is deployed. As such, in this embodiment, the first grasping handle (6) is the handle held and therefore operated by the parent or taller user of the umbrella. From the first grasping handle (6), a telescopic extension member (8) is extended vertically and downwards, wherein the extension member (8) is collapsible in nature and advantageously offers being adjusted at different heights as chosen and selected exclusively by the user, with the second telescopic portion of the extension member (8) passing inside of the first telescopic portion and pole. For umbrellas, the pole and extension member are conveniently linear and rigid rather than being flexible to impart stability to the device.

The canopy (1) is attached to a canopy support structure composed of a canopy support frame attached to the upper part of pole (4). A typical canopy support structure includes a conventional frame composed of a plurality of ribs for receiving and attaching the canopy thereto. The forward end of the pole (4) includes a cap that is provided to close off the hollow pole (4). And as noted, the pole (4) is operatively associated with and connected directly to a first grasping handle (6) for holding the umbrella upright when the umbrella is open for use.

The first button (6 *a*) when engaged releases a runner to deploy the canopy structure and canopy. The illustrated button is designed as a dual actuator in that pressing the button (6 *a*) once causes the umbrella to open while pressing the button (6 *a*) a second time causes the canopy to collapse while leaving the pole (4) extended. The user then closes the umbrella by pulling the runner assembly downward towards handle (6).

The telescopic extension member (8) is further operatively connected with and is in direct contact with a second grasping handle (10), which is suited and meant to be held by the child or a shorter user. As such, the extension member (8) is an extension of the pole (4), and the extension member (8) passes through the first handle (6). Thanks to this feature, as the extension member (8) is vertically collapsible and adjustable, it thereby affords the advantage to allow the second handle (10) to be placed adjacent the first handle (6) when desired by the adult user and at will. This of course, in return, provides the effect of altering the height of the umbrella (1), such that it can easily assume a minimum and a maximum height fully controlled by the adult or first user. Without being limited by theory, in other words, the height of the umbrella (1) can be easily adjusted by the telescopic extension member (8), such that the lower second handle (10) becomes extendable in order for the umbrella (1) to be held comfortably by a child or other person having substantially lesser height than the adult user. In accordance with this embodiment, this is preferably achieved by the child or shorter user holding the second handle (10) on one side, and the adult or taller user holding the first handle (6) on the other side, thereby advantageously balancing out each other.

The second handle (10) further has built therein a button (10 *a*) to operate the telescopic extension member. When button (10 *a*) is engaged, the extension member (8) is dropped to the lower position for grasping of the handle by the child. Thus, button (10 *a*) on the second handle acts as a release. Preferably, button (10 *a*) can be configured to release the second handle 10) from the first handle (6), to change the adjustable height of the second handle by having a plurality of locking positions so that different heights can be selected each time the extension member (8) clicks into place, and ultimately, to release the second handle (10) when extended, so that it can retract and be accommodated inside the pole with the second handle (10) located adjacent to or attached to the first handle (6). In many ways, button (10 *a*) operates similar to button (6 *a*) which is conventional on many umbrellas as a catch/release mechanism for deploying and retracting the canopy (1).

Alternatively, the second button (10 *a*) can be provided on the first graspoing handle (6) so that it can be engaged there to release second grasping handle (10) from attachment to the first grasping handle (36) and to deploy telescopic extension member (8) vertically downwards away from handle (6). Extension member (8) and second grasping handle (10) are shown in a deployed position in FIG. 1 which occurs after the second button is engaged and handle (40) is released.

For either embodiment, the second grasping handle (10) can be retained in position at a desired distance from the first grasping handle (6) by twist locking the handle (10) at the desired location beneath handle (6). Extension member (8) is collapsible in nature within pole (4) and advantageously provides movement to allow handle (10) to be positioned at different locations as chosen and selected exclusively by the user. When returning handle (10) to connection with handle (6), extension member (8) passes inside of pole (4).

In FIG. 1, it can be seen that the extension member (8) is found at a maximum extendable conformation over a distance shown as (8 a). FIG. 2, on the other hand, shows the extension member (8) is fully positioned within pole (4) such that the distance the first upper user grasping handle (6) and the second lower handle (10) are now in contact with the second handle (10 attached to the first handle (6).

Figure 4:
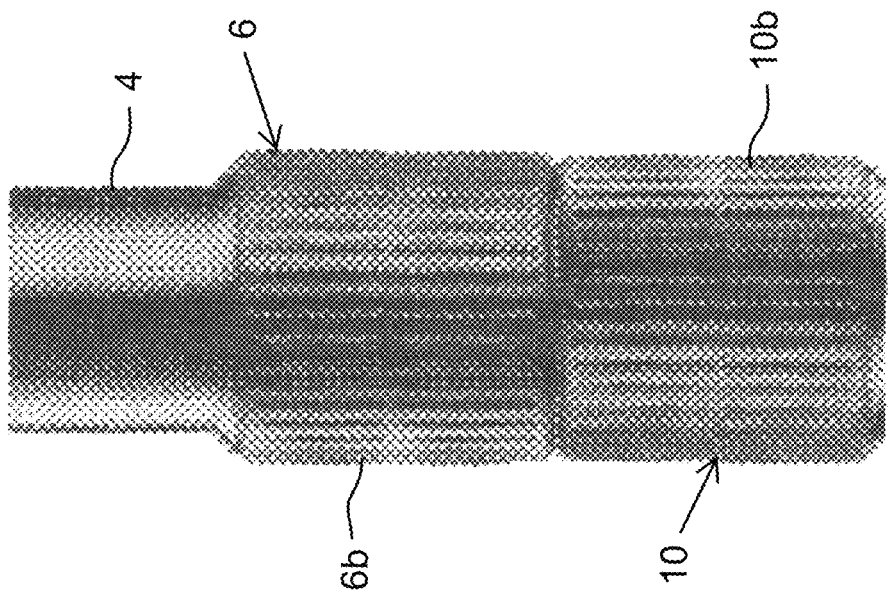
FIG. 4 is a view of the dual handles of the umbrella in a closed or locked position.
Figure 3:
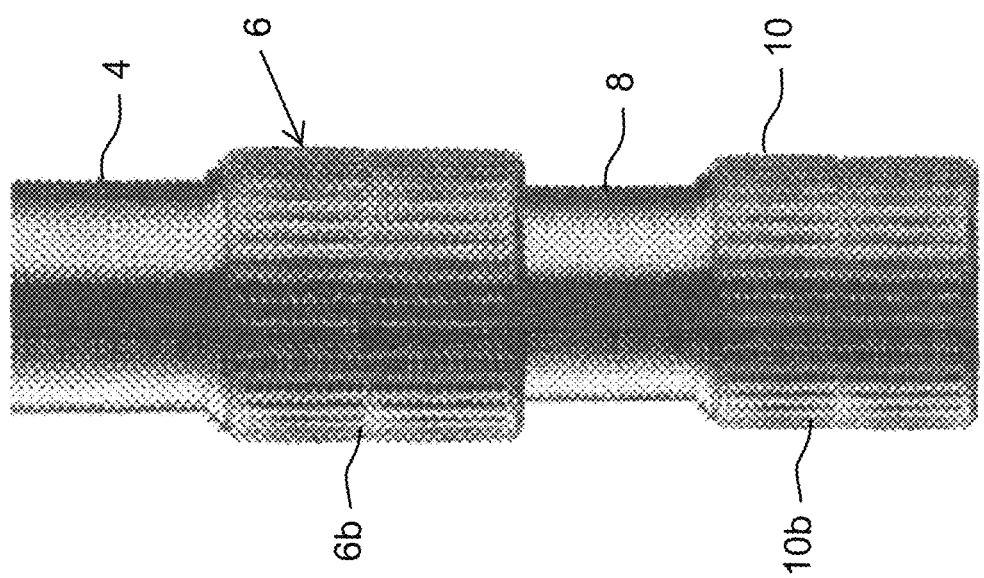
FIG. 3 is a view of the dual handles of the umbrella in an extended position.

FIGS. 3 and 4 illustrate a preferred arrangement of the handles (6), (10) where each has a knurled or roughened surface (6 b), (10 b) to facilitate grasping. FIG. 3 illustrates the second handle (10) spaced from the first handle (6) with extension member (8) pulled out of pole (4), while FIG. 4 illustrates the handles (6), (10) locked together. In this preferred arrangement, the pole (4) and extension member (8) are configured and dimensioned such that, when the umbrella is not employed, the extension member (8) is fully received within the pole (4) with the handles attached together for compact storage. This assures that the second handle does not detach from the first handle when moving the umbrella to storage or when carrying it around when not in use.

Figure 5:
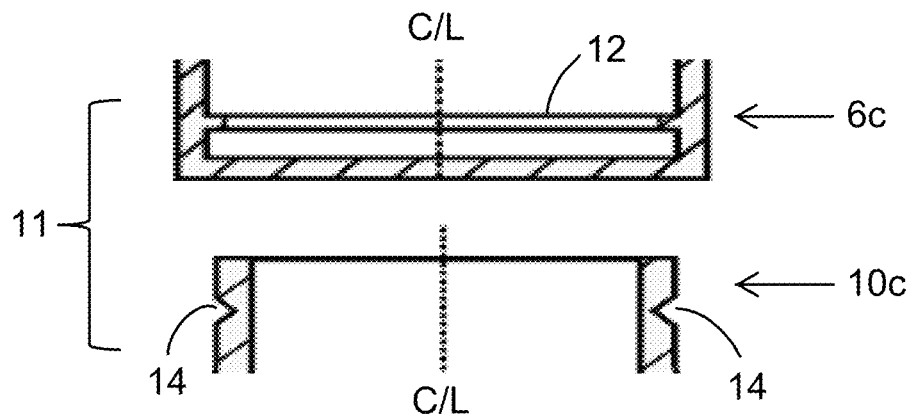
FIG. 5 is a cross-sectional view of a locking mechanism for attaching the second handle to the first handle.

FIG. 5 illustrates a simple locking mechanism (11) for attaching the second handle (10) to the first (6). In this figure, the ends of the first and second handles (6 c), (10 c) are shown in cross-section to illustrate how they are attached together. The locking mechanism (11) is a snap fit joint that utilizes a ridge at the circumference of one component which locks into a groove on the second component. While there are numerous ways to make a locking connection, FIG. 5 shows how to provide the lower end of the first handle member (6) with a protrusion in the form of a small internal ridge (12) on its inner circumference near the end that faces the second handle (10). The second handle (10) is provided with a snap-locking recess in the form of a small groove (14) on its external circumference near the end that first faces the first handle (6). The two handles can then be securely connected together by a simple pushing of the second handle (10) into the first handle (6) for snap-locking of the handles together as the second handle is retracted from its operative position to an inoperative or storage position. Of course, this specific arrangement can be reversed with the ridge provided on the outer circumference of the second handle (10), and the groove provided on the inner circumference of the first handle (6). Skilled artisans will recognize variations of this type of connection, including others that are well known in the art that would be suitable for use in the present invention. It is helpful to note that the attachment force provided by this attachment is low such that it can be easily overcome either by the user pulling the second handle (6) away from the first or in a more elegant fashion by depressing a button or dial to release a compressed spring that will deploy the second handle (6) by urging the extension member (8) to move away from the first handle (10).

Figure 6:
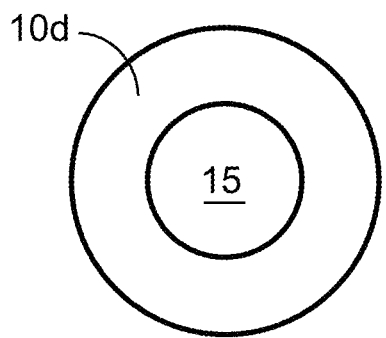
FIG. 6 is a view of the lower surface of the second handle to illustrate a button for deployment of the second handle.
Figure 7:
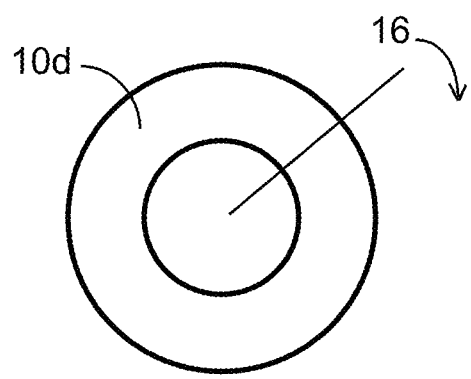
FIG. 7 is a view of the lower surface of the second handle to illustrate a dial for deployment of the second handle.

FIGS. 6 and 7 illustrate two different types of deployment mechanisms for releasing the second handle from the first handle. FIG. 6 shows a deployment mechanism that includes a conventional spring and a releasing member in the form of a simple button (15) located on the lower surface (10 d) of the second handle that can be depressed to deploy the spring, while FIG. 7 illustrates a deployment mechanism that includes the spring and a releasing member in the form of a dial (16) located on the lower surface (10 d) of the second handle that could be simply turned 90° or so to release the spring. These again are conventional mechanisms which are suitable for use in the present invention.

When the pole and extension member are each cylindrical, one is preferably configured to be of a larger diameter than the other so that one can move in the other. Typically, the extension member will have a smaller diameter so that it can telescopically fit within the pole for retraction therein when the umbrella is not deployed. Alternatively, the upper end of the extension member can be configured to be securely received within the user grasping handle. This can be accomplished by a screw thread or press fitting connection or by using a suitable adhesive to join those parts together. The extension member can then be configured to have a length that is telescopically adjustable and that when collapsed fits within the second handle for compact storage when the umbrella is not deployed.

Figure 9:
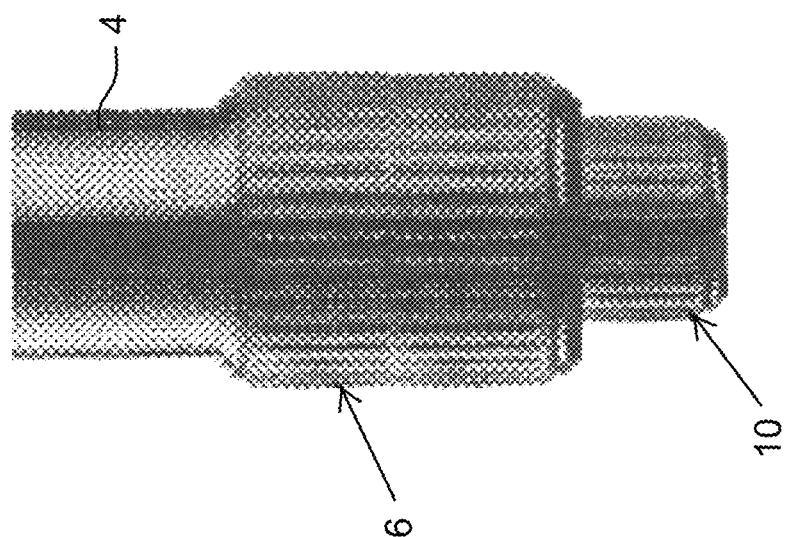
FIG. 9 is a further view of the dual handle umbrella according to FIG. 8, with the second handle partially inserted into the first handle.
Figure 8:
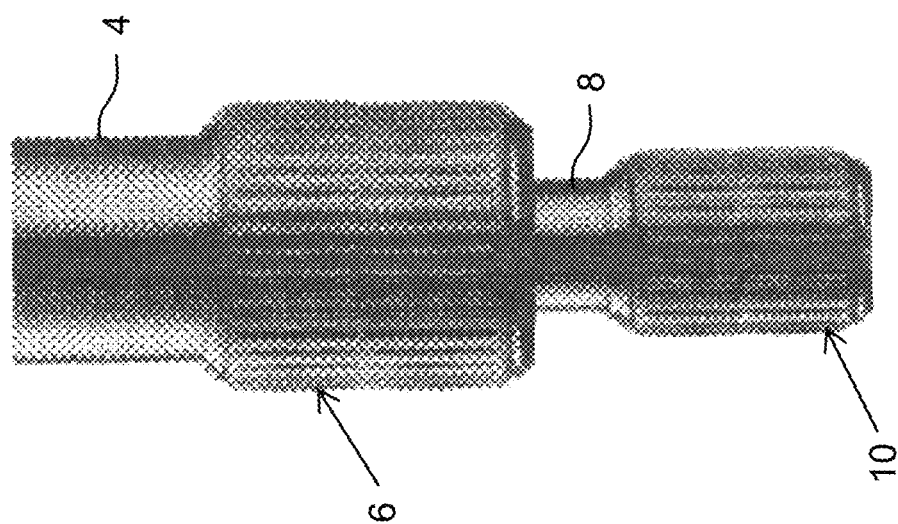
FIG. 8 is a view of another embodiment of the dual handle umbrella according to the present invention, with the second handle spaced from the first handle.
Figure 10:
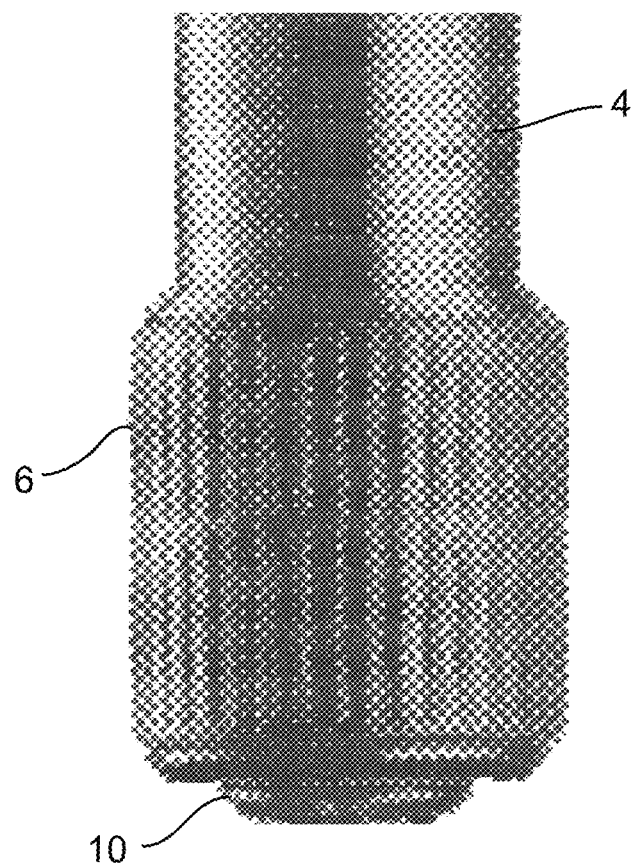
FIG. 10 is a further view of the dual handle umbrella according to FIG. 8, with the second handle substantially completely inserted into the first handle.

FIGS. 8, 9 and 10 illustrate additional embodiments of the invention, wherein the second handle (10) can be configured to be smaller in outer circumference than the inner circumference of the first handle (6). And while these handles are shown as being cylindrical, it is envisioned that they can also be configured as ovals or with a polygonal circumference such as triangular, square, rectangular, hexagonal, octagonal, etc., the particular shape having no bearing on the invention provided that the poles and handles are configured to fit one inside the other. Typically, each will preferably have the same circumferential shape although that is not a specific requirement for construction of the invention.

In FIGS. 8, 9 and 10, the second handle (10) is shown as having a smaller outer circumference than the inner circumference of the first handle (6) with the second handle (10) shown approaching insertion into first handle (6). Of course, as understood from the previous description, the second handle (10) could be extended as far as necessary along the length of extension member (8) to provide sufficient spacing for grasping of second handle (10) by the child or shorter user of the dual handle invention.

FIG. 9 shows an inoperative position where the second handle (10) is partially secured within the inner circumference of first handle (6). There are a number of ways that this arrangement can be achieved, such as by twist locking the second handle within the first or by engaging a snap locking mechanism similar to that shown in FIG. 5. Of course, the internal circumference of the first handle (6) would be configured with the appropriate dimensions to facilitate this attachment. In particular, a portion of the internal circumference would be smaller than that at the end of the first handle (6).

FIG. 10 illustrates another embodiment where the second handle 10 is substantially completely received within first handle (6). Again, a snap locking or other functionally similar mechanism can be used to achieve this.

In the embodiments of FIG. 8, 9 or 10, the second handle (10) can be provided with a button (15) or dial (16) as shown in FIGS. 6 and 7 in order to release the second handle from the first handle to place the second handle in an operative position when the umbrella canopy is to be opened open or is open.

As the previously described embodiment is a preferred one, it is also possible for skilled artisans to easily make alternative constructions that provide the same functional advantages of the invention. For example, it would also be possible for the second handle (10) to be made larger than first handle (6) so that in the inoperative position first handle (6) would be partially or fully located within second handle (10). This would be achieved by making the inner diameter of the opening of handle 10 larger than the outer diameter of first handle (6), which is essentially a reversal of the embodiments shown in FIGS. 8, 9 and 10, where the pole (4) would be attached to second handle (10) and first handle (6) would form the terminal end of the device.

Additionally, it is also possible to construct the pole (4) of a sufficient length to position the second handle (10) at a desired level to accommodate grasping by the child or shorter user, while constructing the first handle (6) to be adjustable away from second handle (10) towards the canopy to provide the appropriate grasping location for the adult or taller user. This would be achieved by making handle (10) in FIGS. 1 and 2 fixed in position while handle (6) would be movable over distance (8 a).

FIGS. 1 and 2 also indicate another feature of the invention, which is a wrist or loop band (13) that can be provided on either the first (6) or second (10) handle, respectively. This band (13) can facilitate carrying of the umbrella (1) when it is not deployed. The band (13) is shown attached to the first handle (6) in FIGS. 1 and 2. When it is attached to the second handle (10), however, it can be used to wrap around the child's hand to keep the child near the adult. In this embodiment, the band may be adjustable to conform to the child's hand. This can help prevent the child from running away from the adult or possibly from falling when walking together.

A locking mechanism is advantageously provided for retaining the extension member in an operative position. This mechanism comprises a twist locking mechanism which is engaged by twisting the extension member with respect to the elongated member. These are typically a cam-lock interlocking device that provides lockable positions along the shaft of the elongated member. They typically include a cam or protuberance constructed in the inner surface of the interlocking device which is arranged to press against the shaft when the interlocking device is in a locked condition and not press against the shaft when the interlocking device is in an unlocked condition. In another example of the locking structure, the interlocking device may cooperate with indents, weatherproof cutouts or slots that are constructed in the shaft to provide a number of discrete lockable positions for the second grasping handle. A suitable locking mechanism is disclosed in U.S. Pat. No. 4,856,929 although there are numerous variations and improved versions of this type of mechanism that are well known to skilled artisans and which are deemed to be suitable for use in the present invention. For example, the structures disclosed in U.S. Pat. No. 7,726,326 and US patent application US2019/0274401 are also suitable for use in the present invention. These types of structures can generally be included within the second grasping handle but if desired can also be included within the first grasping handle so that the height location of those handles can be selected based on the heights of the users and then locked in place at those locations. Typically, however, the first grasping handle will be fixed in position on the pole such that only the second grasping handle would require the twist locking mechanism.

Figure 13:
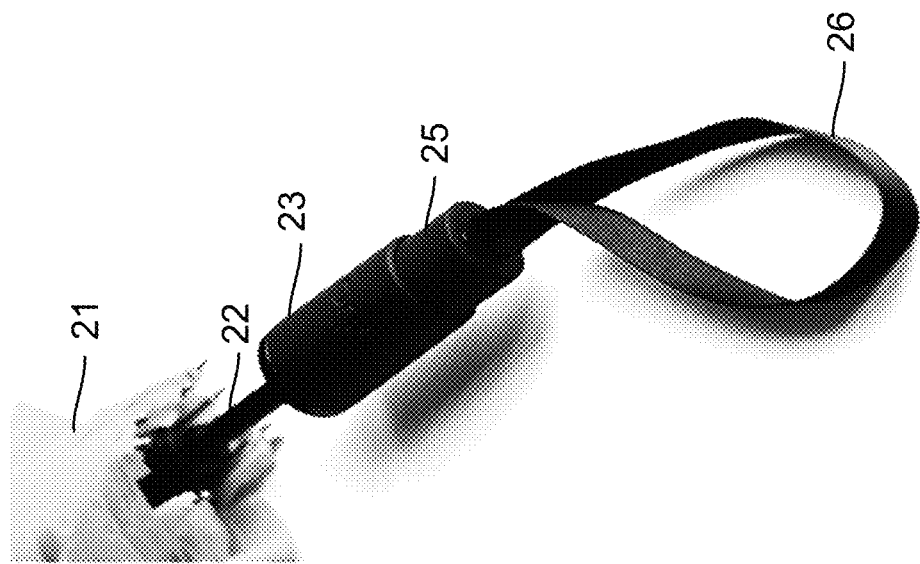
FIG. 13 is a view of the dual handle umbrella of the invention of FIG. 11 wherein the second handle has just been initially released from the inoperative position and begins to extend from the first handle.

Another embodiment of the dual handle umbrella is depicted in FIGS. 11 to 16. This unitary dual handle umbrella (20), is composed of a canopy (21) attached to the upper part of an umbrella pole (22). The pole (22) is operatively associated and is connected directly with a first grasping handle (23) for holding the umbrella upright when open for use. The first grasping handle (23) further has built therein a button (24). In one variation, when button (24) is engaged, the canopy (21) is deployed. In another embodiment, engaging button (24) releases and/or deploys the second grasping handle (25) from within the first grasping handle (23). This arrangement utilizes a conventional spring to urge or force the second handle (25) to exit from the first handle (23). The spring can be selected to provide a force that simply moves the second handle (25) past the snap lock as shown in FIG. 13 where it can be grasped by a user for further extension and locking as described below. Alternatively, the spring force can be sufficient to urge the second handle to separate from the first handle and to even move that handle to the maximum spaced distance of the second handle as shown in FIG. 15. Of course, the button (24) is not a required feature of the invention as both the canopy of the umbrella as well as the extraction of the second handle (25) can be performed manually.

Figure 12:
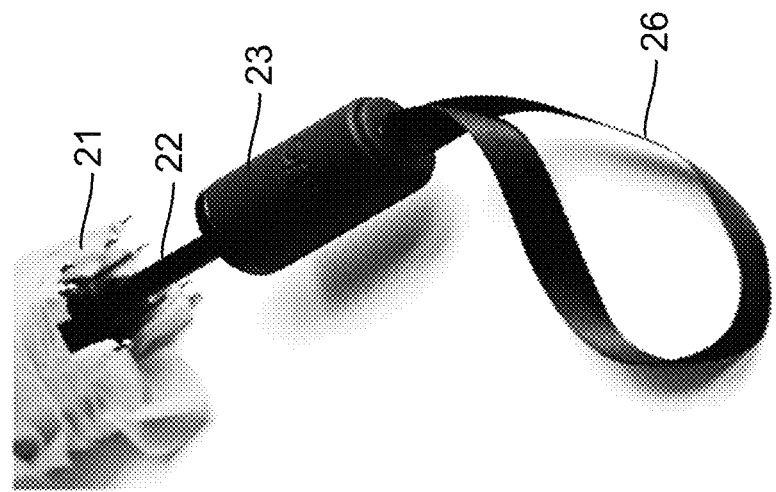
FIG. 12 is a view of the unitary dual handle umbrella of FIG. 11, with the second handle substantially completely inserted into the first handle.
Figure 11:
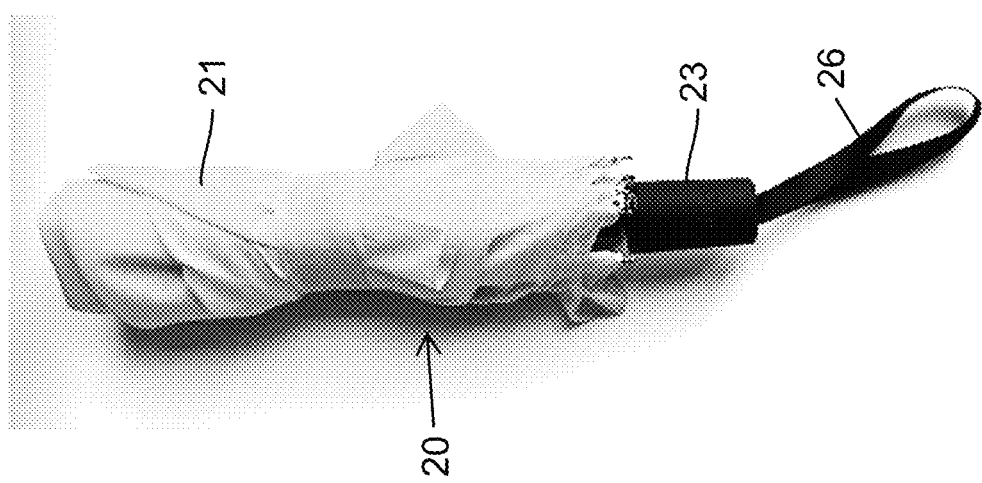
FIG. 11 is a side view of a compact conformation of the unitary dual handle umbrella in accordance with another embodiment of the invention.

As shown in FIGS. 12-14, the first grasping handle (23) is sufficiently large to accommodate the entire second grasping handle (25) therein either for storage when the umbrella is not in use, as well as when the umbrella is operated by only one user. The second grasping handle is held within the first handle by a snap lock which prevents disconnection due to gravitation to avoid exposing the second handle when not needed. In the inoperative position, only the lower end of the second grasping handle (25) is visible as shown in FIG. 12 and it appears to be the end part of the first grasping handle (23). As best shown in FIGS. 12-13, the end of the second grasping handle (25) includes a wrist band (26) securely attached thereto. In an embodiment, the first grasping handle does not include a button (24) and the second grasping handle (25) is manually withdrawn from within the first grasping handle by pulling on wrist band (26). One of the users can grasp and simply tug on the wrist band (26) to withdraw it from within the first handle (23) by overcoming the attachment force of the snap locking mechanism. This enables the second user to grasp the second grasping handle (25) and move it to a desired position below the first grasping handle for easy positioning for grasping.

According to another embodiment, the first grasping handle can include one button for deploying the canopy and a second button for releasing the second handle from storage within the first grasping handle. Additionally, when the first grasping handle is configured to reside inside of the second grasping handle, a first button is provided for releasing the canopy and a second button is provided for moving the second handle away from the first handle. In that embodiment, both buttons can be provided on the second handle or in another location on the pole. Alternatively, one button could be provided on the second handle for its release and the other button for opening the canopy on the first handle. It is also possible to provide a single button that simultaneously deploys the canopy and releases the second handle from the first although that limits the use of the umbrella to situations where the second handle is available which would require an additional step of moving the second handle to the inoperative position when the umbrella is to be operated by a single user.

FIG. 16 illustrates a position of the second handle (25) that is about midway between the inoperative position (FIG. 14) and fully extended position (FIG. 15), but the second handle can be placed at any position between the two extremes because the second handle can be moved vertically downwards or upwards by the freely sliding extension member (27) smoothly moving downwards or upwards to a selected position that corresponds to a comfortable holding position for the height of the second user. Once the selected position is determined, the second user can twist the second grasping handle (e.g., by turning it clockwise or counterclockwise) to lock the second handle in the desired position. Although not mandatory, the first grasping handle can also be provided with a twist locking mechanism so that the first user can also adjust the height of the handle to comfortably grip that handle as well as to position the canopy at a desired height above the first user. This can be achieved by providing an additional internal tube with the twist locking mechanism associated with the first handle. In this embodiment, the handles do not typically include buttons such that manual operation is used to open the umbrella, extract the second handle and to position the two handles where desired. When the umbrella is no longer needed, e.g., it stops raining or the users arrive at an enclosed location, the second grasping handle can be unlocked by rotation in the opposite direction (e.g., counterclockwise or clockwise as opposite to the locking rotation) so that the second grasping handle can be moved and returned to the inoperative position where it is snap locked in place in position within fully the first grasping handle (18).

FIGS. 11-16 illustrates a typical different canopy constructions that can be used with the dual handle umbrella of the invention, with the umbrella (20) shown in the form of a compact telescopic model. Alternatively, the dual handle can be provided on an umbrella that has the form of a fixed shaft model which is relatively sturdier and generally used for larger size umbrellas as the shaft is able to properly deploy a relatively larger canopy. The compact telescopic model, however, is lightweight and of a relatively smaller in size than the fixed shaft model when the compact telescopic model is fully compressed. This umbrella (20) generally supports smaller canopies many of which provide sufficient coverage for two users. An additional benefit of the compact form of umbrella (20) is that it can be collapsed to a small size to accommodate carrying in a handbag or backpack.

Figure 17:
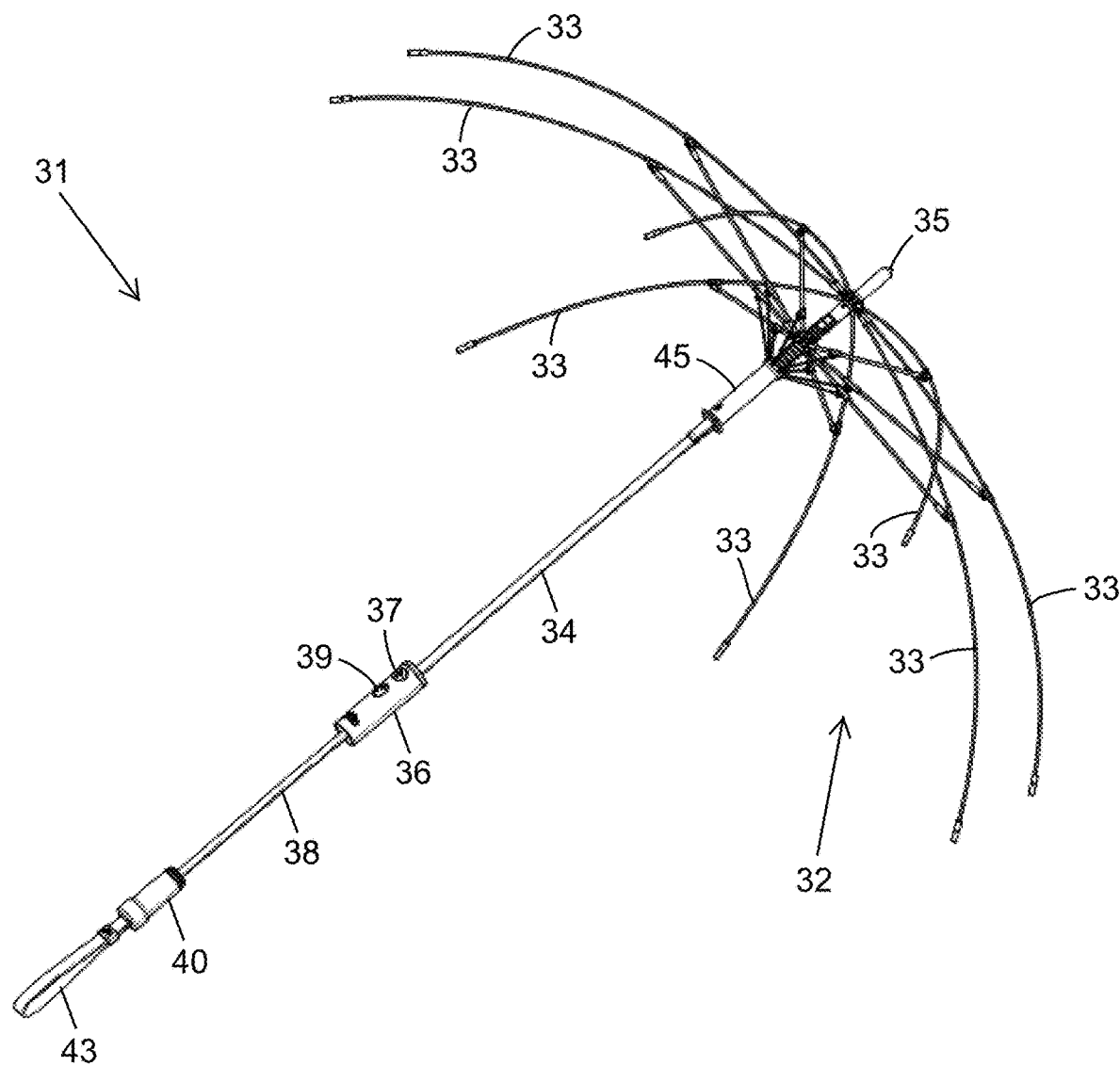
FIG. 17 is a perspective view of a preferred dual handle and canopy support structure for an umbrella.

FIG. 17 is a perspective view of a preferred dual handle and canopy support structure for a preferred device (31) shown as an umbrella. This structure is composed of a canopy support frame (32) attached to the upper part of an extension member in the form of an umbrella shaft (34). Canopy support structure (32) includes a conventional frame composed of a plurality of ribs (33) for receiving and attaching a canopy thereto. The forward end of the shaft (34) includes a cap (35) that is provided to close off the shaft (34). The shaft (34) is operatively associated with and connected directly to a first grasping handle (36) for holding the umbrella upright when the umbrella is open for use.

Handle (36) has a first button (37) that can be engaged for releasing a runner (45) to deploy canopy structure (32) and canopy. First button (37) is a deployment member that acts with spring (46) as a deployment mechanism to release runner (45) for engagement with the canopy structure (32) to open the canopy. The illustrated button is designed as a dual actuator in that pressing the button (37) once causes the runner (45) to move toward canopy structure (42) of the umbrella while pressing the button (37) a second time causes the open canopy structure (32) to collapse while leaving the shaft (34) extended. The user then closes the umbrella by pulling the runner assembly (50) downward towards handle (36) in a conventional manner.

Handle (36) also has a second button (39) which acts as a releasing member when engaged to release second grasping handle (40) from attachment to or positioning within the first grasping handle (36) and to deploy telescopic extension member (38) vertically downwards away from handle (36). Extension member (38) and second grasping handle (40) are shown in a deployed position which occurs after the second button (39) is engaged and handle (40) is released. The second grasping handle (40) can be retained in position at a desired distance from the first grasping handle (36) by twist locking the handle (40) at the desired location beneath handle (36). Extension member (38) is collapsible in nature within shaft (34) and advantageously provides movement to allow handle (40) to be positioned at different locations as chosen and selected exclusively by the user. When returning handle (40) to connection with handle (36), extension member (38) passes inside of shaft (34). The end of extension member (38) is configured so that it cannot be removed from shaft (34) or handle (36). Also shown is wrist band (43) which is attached to the second grasping handle (40) and which can be grasped to pull handle (40) to a desired position for locking after handle (40) is released.

Figure 18:
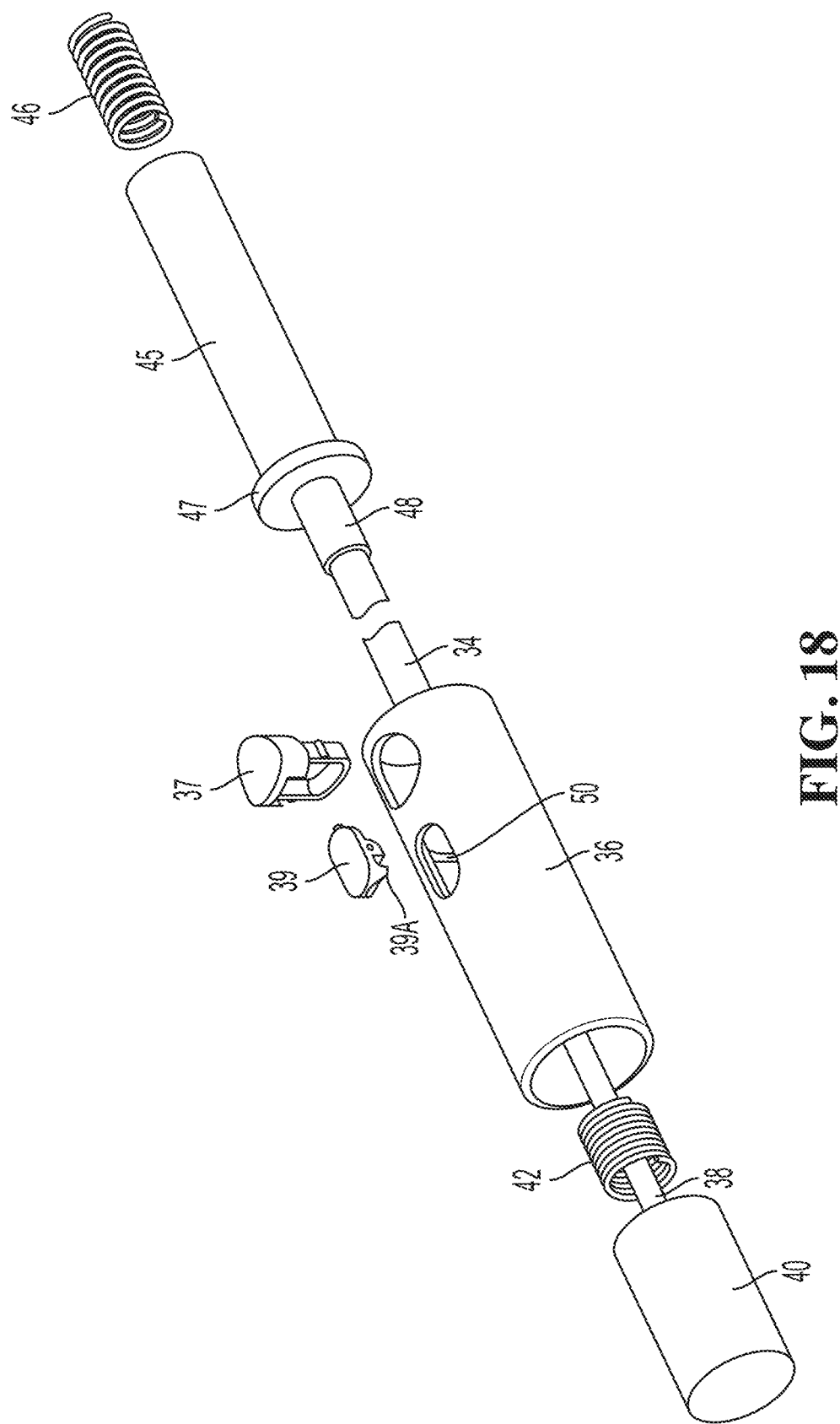
FIG. 18 is a detailed view of the dual handles and runner of the umbrella of FIG. 17.
Figure 19:
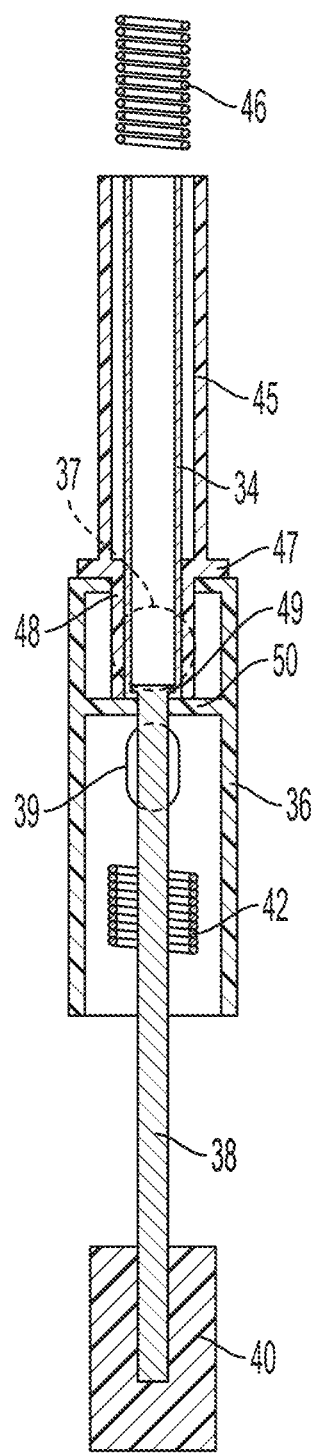
FIG. 19 is a cross-sectional detailed view of the dual handles and runner of the umbrella of FIG. 17.

FIGS. 18 and 19 are detailed views of the first and second grasping handles and runner of the umbrella of FIG. 17. Similar to what is disclosed in FIGS. 8-10, Second grasping handle (40) is configured to be smaller in outer circumference than the inner circumference of the first grasping handle (36) so that the second grasping handle (40) can be the second handle (10) is partially or fully received within the inner circumference of first grasping handle (36) such that no internal components of the handles are exposed. FIGS. 18-19 show handle (40) partially received in handle (36). The outer surfaces of the handles (36), (40) are configured for grasping such as with grooves as shown in FIGS. 8-9 or similar discontinuous surfaces to facilitate water removal from the handle to improve gripping when the handle is wet. Alternatively, the handle surface can be made of a flexible or compressible material to facilitate secure grasping, as shown in FIGS. 11-17.

The shaft (34) is connected directly to the first grasping handle (36) for holding the umbrella upright when the umbrella is open. Runner (45) freely moves along shaft (34) from a position where flange (47) of runner (45) is in contact with the upper end of the first grasping handle (36) to a disposed position toward the canopy support structure (32) when the canopy is to be opened. Runner (45) includes forward end (48) which is conventionally engages a hook located on button (37) when the umbrella is collapsed for storage while holding runner (45) in position against first grasping handle (36). Spring (46) is extended when runner (45) is held against handle (46). When button (37) is depressed, it acts as a deployment member to disengagge the forward end (48) of the runner (45) so that spring (46) can contract and pull runner (45) toward the canopy support structure (32). The user then can grasp and push the released runner (45) upward towards the canopy support structure (32) to further expand the ribs (33) which then stretch the canopy over the canopy support structure as in a conventional umbrella.

The opposite end of the first grasping handle (36) has a mechanism for releasing second grasping handle (40). A biasing member (42), preferably in the form of a spring, is located inside first grasping handle (36). In this embodiment, when second grasping handle (40) is not in use, it is stored at least partially inside first grasping handle (36), where it compresses biasing member (42) against interior wall (50) and holds it in place by a locking member, preferably in the form of a tooth (39A) on button (39) that engages the forward end of second grasping handle (40). When button (39) is depressed, it acts as a releasing member to lift tooth (39A) to release he second grasping handle (40) from compressing biasing member (42), which in turn expands to simply push second grasping handle (40) at least partially outside of first grasping handle (36). A user of theumbrella can then either grasp the exposed handle (40) or pull it completely out of the first grasping handle. As shown, second grasping handle (40) is attached to the rearward end of extension member (38). Pulling on second grasping handle (40) then extends it to a desired positioin to be secured for use by a twist locking mechanism. Extension member (38) also includes a distance limiting member (49) in the form of a crimped or flared end which is larger than the opening in wall member (50) and which prevents the forward end of extension member (38) from being pulled ocmpletely out of shaft (34) and first grasping handle (36).

FIGS. 20A and 20B are cross-sectional detailed views of a preferred twist locking mechanism for the umbrella of FIG. 17. This mechanism may be threaded member (51) which may be mounted upon or attached to the end of extension member (38), which is operatively associated with a pair of protuberances or cam members (52A), (52B). Thus, when the user twists second grasping handle (40) after pulling it to the desired position, the threaded member (51) pushes apart the pair of protuberances or cam members (52A), (52B) which then engage the inner wall of shaft (34) to twist lock the second grasping handle (40) in the desired position for use by the second user.

In a preferred embodiment, the second grasping handle and extension member are provided in an umbrella, where one person can grasp the first grasping handle and another can grasp the second grasping handle. In a preferred embodiment, the first user can be an adult while the second user is a child. Of course, the first user can be a taller person wherein the second user is a shorter person.

It will be appreciated that the pole or shaft of the umbrella need not be a single-piece shaft design since aspects of the present invention may be applicable to a telescopic shaft arrangement, such as a shaft arrangement where two or more shafts slide within one another but do not necessarily collapse inside the other to provide an overall reduction in shaft length. The present invention then would add the extension member and second handle. Suitable shafts of these types are disclosed in U.S. Pat. No. 7,726,326, while an improved shaft and rib assembly for an umbrella is disclosed in U.S. Pat. No. 9,609,926.

The preferred embodiment of the present invention relates to an improvement of a conventional umbrella by incorporating a second handle, generally for grasping by a second user. The extension member is adjustable to place the second grasping handle at different distances away from the first grasping handle, such that a person who is shorter than the user can hold onto the umbrella by grasping the second grasping handle. This is particularly useful when the first user is a parent and the second user is a child as disclosed in U.S. Pat. No. 10,143,276.

And as two persons are utilizing a single umbrella, it would be beneficial for the canopy to be configured to provide coverage that accommodates both people. A typical canopy has an approximate diameter of about 43 to 50 inches, but for the dual handled umbrella, a larger canopy diameter of about 50 to 57 inches can be used. Other sizes up to 60 to 72 inches or more can be used if desired. Of course, a skilled artisan can select any particular size that is desired for the desired canopy and the elongated and extension members would be configured appropriately to properly deploy and utilize the larger canopy.

The present invention preferably includes a wrist or loop band on the first or second grasping handle, respectively as shown in U.S. Pat. No. 10,143,276. This band can facilitate carrying of the umbrella when not deployed. When the band is attached to the second grasping handle, however, it can also be used to wrap around the child's hand to keep the child near the adult. Additionally, the band may be adjustable to conform to the child's hand. This can help prevent the child from running away from the adult or possibly from falling when the two are walking together. The wrist band is also useful in certain embodiments to manually disengage the second handle from the first handle for extension into the desired position for grasping by the second user. The wrist band is simply grasped and pulled to overcome the attachment force between the handles. For this embodiment, the wrist band will typically be a fabric, cord, string, or metal loop strongly adhered to the bottom of the second handle.

The present invention is also useful to improve many devices other than umbrellas. Suitable devices for improvement include any device that incorporates a telescopic reach extender as an elongated member and that currently includes one handle for operation. Such devices include a ceiling light bulb changing device, a squeegee, a painting tool that utilizes brushes or rollers, a cleaning implement such as a duster or brush, a gutter cleaning wand, or even mechanical tools such as large wrenches and screwdrivers. Certain surgical tools such as retractors, forceps and other devices that are manipulated by the use of a handle can also be improved by the inclusion of the present invention. Additionally, the extension member and elongated member can be flexible rather than rigid although linear, rigid constructions are preferred for device stability. And in certain embodiments, the second grasping handle can be grasped by the same user when more force or control of the elongated member and associated tool is required. In other embodiments, one user can grasp the first grasping handle while another user can grasp the second grasping handle to help control movement or enhance operation of the device.

Unless defined otherwise, all technical and scientific terms used herein have the same meaning as commonly understood by one of ordinary skill in the art to which this invention belongs.

Unless defined otherwise, all technical and scientific terms used herein this disclosure have same meaning as commonly understood by one of ordinary skill in the art to which this invention belongs. As used herein and in the appended claims, the singular form "a," "and," "the" include plural referents unless the context clearly dictates otherwise. And, as noted, different materials or constructions that are similar or functionally equivalent to those specifically described herein can be used in the practice of the present invention, with exemplary materials described herein for illustrative purposes only.

The terms "comprises," "comprising," "includes," "including," "having" and their conjugates mean "including but not limited to." Terms and phrases used in this application, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. Adjectives such as e.g., "conventional," "traditional," "known" and terms of similar meaning should not be construed as limiting the item described to a given time period, or to an item available as of a given time. Instead, these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

It should also be understood that the individual components of the dual handle umbrella in the Figures may not necessarily have been drawn to a correct scale. As such, due to the reason that the Figures are only for illustrative purposes, the comparable sizes of the individual components of the dual handle umbrella should not be limited and construed to be exactly what is viewed in the Figures.

It will be readily understood by one of ordinary skill in the relevant art that the present invention has broad utility and application. For example, the inclusion of a second handle on devices other than umbrellas enables better control and operation of such devices according to the specific features disclosed for the preferred embodiments of umbrellas. And although the present invention has been described and illustrated herein with referred to preferred embodiments, it will be apparent to those of ordinary skill in the art that other embodiments may perform similar functions and/or achieve like results. Thus, it should be understood that various features and aspects of the disclosed of the disclosed embodiments can be combined with, or substituted for one another in order to form varying modes of the disclosed invention. Many different embodiments such as variations, adaptations, modifications, and equivalent arrangements are will be implicitly and explicitly disclosed by the embodiments described herein, and thus fall within the scope and spirit of the present invention. Thus, the scope of the embodiments of the present invention should be determined by the appended claims and their legal equivalents rather than by the specific examples, preferred embodiments or drawing figures.

What is claimed is:

1. In a device having an extendable length and comprising an elongated member, a first, fixed grasping handle associated with the elongated member for holding or manipulation of the device, a second, extendable grasping handle and an extension member that is operatively associated with the elongated member, with the extension member capable of positioning the second grasping handle in any one of a number of positions spaced a distance away from the first grasping handle to extend the length of the device, including an inoperative position and a number of operative positions, wherein, when the second grasping handle is fixed in an operative position, a first user can grasp the first grasping handle and a second user can grasp the second grasping handle, the improvement comprising a twist locking mechanism for adjustably and fixedly positioning the second grasping handle on the extension member which mechanism is engaged by twisting the second grasping handle with respect to the elongated member, and wherein (a) one of the first or second grasping handles includes a snap locking recess and the other includes a protrusion that is received in the snap locking recess to attach the first or second grasping handles together when in the inoperative position, or (b) one of the first or second grasping handles is partially or fully retracted in the other handle when in the inoperative position.

2. The device of claim 1, wherein the first grasping handle is affixed to the elongated member, the second grasping handle is affixed to the extension member, the second grasping handle in the inoperative position is attached to the first grasping handle, and the second handle includes a wrist or loop band attached thereto.

3. The device of claim 1, wherein one of the first or second grasping handles includes a snap locking recess and the other of the first or second grasping handles includes a protrusion that is received in the snap locking recess to attach the first or second grasping handles together in the inoperative position.

4. The device of claim 1, which further comprises a releasing member to release the second handle for deployment when the second grasping handle is to be moved to an operative position; wherein the releasing member is operatively associated with a spring that provides sufficient force to move the second handle away from the first handle for extension towards a desired operative position.

5. The device of claim 1, wherein the second grasping handle in the inoperative position is located at least partially or fully within the first grasping handle.

6. The device of claim 1, wherein the first grasping handle in the inoperative position is located at least partially or fully within the second grasping handle.

7. The device of claim 1, wherein the elongated member is a pole, pipe, tube, conduit or hollow rod member; and wherein the extension member is a pole, pipe, tube, conduit, bar or solid rod member that is configured to move with respect to the elongated member.

8. The device of claim 7, wherein the elongated member, the extension member, or each have a telescopic construction and one member is received within the other to facilitate movement between them.

9. The device of claim 1, which further comprises a distance limiting member operatively associated with the elongated member or the extension member or both to prevent the extension member from disassociating from the elongated member.

10. The device of claim 1, wherein the first grasping handle includes a generally cylindrical portion having a surface that facilitates grasping by the first user's hand and the second grasping handle includes a generally cylindrical portion having a surface that facilitates grasping by the second user's hand, and wherein the elongated member comprises a telescopic reach extender.

11. The device of claim 1, wherein the device is an umbrella, a ceiling light bulb changing device, a squeegee, a painting tool, a cleaning implement, a wrench, or a surgical tool.

12. In a device having an useful length and comprising an elongated member, a first, fixed grasping handle associated with the elongated member for holding or manipulation of the device, a second, extendable grasping handle and an extension member that is operatively associated with the elongated member, with the extension member capable of positioning the second grasping handle in any one of a number of positions spaced a distance away from the first grasping handle to elongate the useful length of the device, including an inoperative position and a number of operative positions, wherein, when the second grasping handle is fixed in an operative position, a first user can grasp the first grasping handle and a second user can grasp the second grasping handle; and wherein the second grasping handle, when in the inoperative position, is either attached to the first grasping handle, located at least partially or fully within the first grasping handle, or at least partially or fully receives the first grasping handle therein, the improvements comprising a twist locking mechanism for adjustably and fixedly positioning the second grasping handle on the extension member which mechanism is engaged by twisting the second grasping handle with respect to the elongated member, and a second handle releasing mechanism comprising a biasing member which provides a force to urge the extension member towards an operative position, a locking member that locks the biasing member in an inoperative position, and an engagement member that releases the locking member when the second grasping handle is to moved to an operative position.

13. The device of claim 12, wherein the twist locking mechanism is engageable by twisting the second grasping handle at a position which correlates to a suitable height adjusted grasping position for the second user.

14. The device of claim 12, wherein the locking mechanism comprises a cam-lock interlocking device that provides lockable positions along the shaft of the elongated member, the cam locking device comprising a cam or protuberance constructed in the inner surface of the interlocking device which is arranged to press against the extension member when the interlocking device is in a locked condition and not press against the extension member when the interlocking device is in an unlocked condition.

15. An umbrella having an extendable length and comprising a canopy, an elongated member and a first, fixed grasping handle associated therewith for holding or manipulation of the umbrella, and a second, movable grasping handle and extension member that is operatively associated with the elongated member, with the extension member capable of adjustably and fixedly positioning the second grasping handle in any one of a number of positions spaced a distance away from the first grasping handle to extend the length of the device, including an inoperative position and a number of operative positions, wherein the second grasping handle is adjustably and fixedly positioned on the extension member by a twist locking mechanism which is engaged by twisting the second grasping handle with respect to the elongated member, wherein, when the second grasping handle is fixed in an operative position, a first user can grasp the first grasping handle and a second user can grasp the second grasping handle, and wherein (a) one of the first or second grasping handles includes a snap locking recess and the other includes a protrusion that is received in the snap locking recess to attach the first or second grasping handles together when in the inoperative position, or (b) one of the first or second grasping handles is partially or fully retracted in the other handle when in the inoperative position.

16. The umbrella of claim 15, wherein the first grasping handle is affixed to the elongated member, the second grasping handle is affixed to the extension member, and the second grasping handle in the inoperative position is attached to the first grasping handle.

17. The umbrella of claim 15, wherein in the inoperative position one of the first or second grasping handles are partially or fully retracted in the other handle.

18. The umbrella of claim 15, wherein the elongated member comprises a telescopic reach extender, and wherein the twist locking mechanism is engageable by twisting the second grasping handle at a position which correlates to a suitable height adjusted grasping position for the second user.

19. The umbrella of claim 15, wherein the canopy or second grasping handle, or both can be deployed from an end of the elongated member opposite the first grasping handle upon engagement of a deployment member associated with one of the first or second handles.

20. The umbrella of claim 19, wherein the canopy is sufficiently large to accommodate two users thereunder.

21. The umbrella of claim 15, either in the form of a fixed shaft model or a compact telescopic model that is lightweight and relatively smaller in size than the fixed shaft model when the compact telescopic model is fully compressed.

22. An umbrella having an extendable length and comprising a canopy, an elongated member and a first, fixed grasping handle associated therewith for holding or manipulation of the umbrella, and a second, movable grasping handle and extension member that is operatively associated with the elongated member, with the extension member capable of adjustably and fixedly positioning the second grasping handle in any one of a number of positions spaced a distance away from the first grasping handle to extend the length of the device, including an inoperative position and a number of operative positions, wherein the second grasping handle is adjustably and fixedly positioned on the extension member by a twist locking mechanism which is engaged by twisting the second grasping handle with respect to the elongated member, wherein, when the second grasping handle is fixed in an operative position, a first user can grasp the first grasping handle and a second user can grasp the second grasping handle, wherein the canopy or second grasping handle, or both can be deployed from an end of the elongated member opposite the first grasping handle upon engagement of a deployment member associated with one of the first or second handles, wherein the deployment member is a button or dial located on a side or bottom surface of the second handle which acts in combination with a biasing member to separate the second grasping handle from the first grasping handle.

* * * * *